United States Patent

Gürich et al.

[11] Patent Number: 6,062,532
[45] Date of Patent: May 16, 2000

[54] ELECTRIC SOLID-BODY ACTUATOR HAVING A HYDRAULIC AMPLITUDE MAGNIFIER

[75] Inventors: Gunter Gürich, Aachen; Hermann Josef Laumen, Heinsberg, both of Germany

[73] Assignee: FEV Motorentechnik GmbH & Co. KG, Aachen, Germany

[21] Appl. No.: 09/076,867

[22] Filed: May 13, 1998

[30] Foreign Application Priority Data

May 14, 1997 [DE] Germany ............................ 297 08 546

[51] Int. Cl.[7] ................................................. F16K 31/122
[52] U.S. Cl. .................. 251/57; 251/129.06; 137/625.65
[58] Field of Search ................................. 251/57, 129.06, 251/335.3, 61.1, 61.2, 61.3; 137/625.65; 60/545

[56] References Cited

U.S. PATENT DOCUMENTS

| 5,417,142 | 5/1995 | Lohmann ........................ 251/129.06 X |
| 5,758,862 | 6/1998 | Sturman ................................. 251/57 X |
| 5,857,662 | 1/1999 | Kappel et al. ......................... 251/57 X |

Primary Examiner—Kevin Lee
Attorney, Agent, or Firm—Venable; Gabor J. Kelemen

[57] ABSTRACT

An actuator assembly for operating a setting member includes an actuator body undergoing a dimensional change upon applying electrical energy thereto; a preliminary pressure chamber for accommodating liquid; a diaphragm sealing the preliminary pressure chamber and being displaceable by the actuator body; a valve member carried by the diaphragm; a transfer chamber for accommodating liquid; and a displaceable plate body disposed in the preliminary pressure chamber and sealingly bounding the transfer chamber. The diaphragm, as it is moved by the actuator body, displaces the plate body. A displaceable piston body sealingly bounds the transfer chamber and has a surface which is smaller than the surface of the plate body, whereby the plate body—with the intermediary of the liquid—displaces the piston body to a greater extent than the displacement of the plate body. The piston body, as it moves, displaces the setting member. A valve opening provided in the plate body is closed or opened by the valve member carried by the diaphragm. In the open position of the valve member, the valve opening establishes a hydraulic communication between the preliminary pressure chamber and the transfer chamber.

15 Claims, 3 Drawing Sheets

ELECTRIC SOLID-BODY ACTUATOR HAVING A HYDRAULIC AMPLITUDE MAGNIFIER

CROSS REFERENCE TO RELATED APPLICATION

This application claims the priority of German Application No. 297 08 546.8 filed May 14, 1997, which is incorporated herein by reference.

BACKGROUND OF THE INVENTION

Solid-body actuators of the piezoelectric or magnetostrictive type have the advantage that the electric energy applied thereto may be converted into mechanical movement (that is, a dimensional change of the actuator body) without friction, play or wear with a high degree of efficiency. Since the excursion amplitude of the actuator which is in the order of magnitude of up to 1500 μm is too small for a number of applications, for higher setting paths such an excursion amplitude has to be converted into a motion of larger amplitude. Ratio transmission systems have been found advantageous with which an increase of the setting path may be obtained by means of an incompressible medium (liquid). To ensure a long service life, however, it is of importance to avoid leakages as described, for example, in an article by Jendritza and Schroder in "Konstruktion 46" (1994, pages 376–380).

SUMMARY OF THE INVENTION

It is an object of the invention to provide an electric solid-body actuator having a hydraulic displacement (amplitude) magnifier which has a leakage-free construction and, at the same time, permits a temperature compensation, as a result of which, for example, an extended operation of a setting member into defined switching positions may be achieved.

This object and others to become apparent as the specification progresses, are accomplished by the invention, according to which, briefly stated, the actuator assembly for operating a setting member includes an actuator body undergoing a dimensional change upon applying electrical energy thereto; a preliminary pressure chamber for accommodating liquid; a diaphragm sealing the preliminary pressure chamber and being displaceable by the actuator body; a valve member carried by the diaphragm; a transfer chamber for accommodating liquid; and a displaceable plate body disposed in the preliminary pressure chamber and sealingly bounding the transfer chamber. The diaphragm, as it is moved by the actuator body, displaces the plate body. A displaceable piston body sealingly bounds the transfer chamber and has a surface which is smaller than the surface of the plate body, whereby the plate body—with the intermediary of the liquid—displaces the piston body to a greater extent than the displacement of the plate body. The piston body, as it moves, displaces the setting member. A valve opening provided in the plate body is closed or opened by the valve member carried by the diaphragm. In the open position of the valve member, the valve opening establishes a hydraulic communication between the preliminary pressure chamber and the transfer chamber.

The preliminary pressure chamber and the transfer chamber which are coupled to one another may be designed as hermetically closed systems. It is a particular advantage of such an arrangement that upon applying electric energy to the actuator body, the latter, by virtue of its dimensional change, exerts a force on a diaphragm which, in turn, applies a force to the large-area plate body. As a result, the valve member carried by the diaphragm closes the valve opening in the plate body, and thus a liquid quantity is sealed into the transfer chamber and provides, by virtue of its incompressibility, that the setting member is displaced in accordance with the transmission ratio determined by the surface ratios of the plate body and piston body, and, in case of a continuing application of electric energy to the actuator body, the setting means is maintained in such a displaced position.

When the actuator body is de-energized, the diaphragm is pulled back with the valve member, so that upon a resilient return motion of the plate body and the piston body, liquid exchange may take place between the preliminary pressure chamber and the transfer chamber. As a result, the transfer chamber is always filled with a liquid of predetermined volume and thus reproducible setting paths (excursion amplitudes) may be ensured even for long service periods. The transfer of the length variation of the actuator body from the diaphragm to the plate body may also be effected in principle by means of intermediate transmission elements. It is, however, particularly expedient if, according to a preferred embodiment of the invention, the valve member (valve head) constitutes simultaneously a transmission member between the diaphragm and the plate body. This ensures that the setting force of the electric actuator body also applies the required sealing force between the valve member carried by the diaphragm and the valve opening provided in the plate body.

Since, conventionally, the diaphragm which closes off the preliminary pressure chamber from the actuator body is very thin, the deformation of the diaphragm is sufficient to compensate for an occasional volume reduction in the preliminary pressure chamber by drawing liquid from the transfer chamber. Volume changes of the liquid due to temperature fluctuations may also be compensated for to a certain degree without adversely affecting the setting accuracy.

According to a further advantageous feature of the invention the preliminary pressure chamber is, however, coupled with a particular device to effect a volume compensation. Such a particular device may be, for example, an accumulator chamber arranged in the preliminary pressure chamber and designed, for example, as a gas bubble accumulator so that in the position of rest of the actuator body a constant filling of the preliminary pressure chamber and transfer chamber at identical pressures is ensured. By means of a suitable setting of the preliminary pressure in the volume compensating device it may even be ensured that the volume increases of the liquid caused by significant temperature increases have no influence on the setting accuracy in case of a suitable design of the resilient support for the plate body and the piston body. An arrangement of such a volume compensating device further has the advantage that the actuator, apart from its connection with the current supply, may be formed as an autonomous system as concerns the liquid supply.

According to another advantageous feature of the invention, the preliminary pressure chamber is coupled with a pressurized fluid supply. By means of such an arrangement it is feasible to provide for a liquid exchange while maintaining a predetermined preliminary pressure thereof.

According to a particularly advantageous feature of the invention, in an electric solid-body actuator for operating a valve in a liquid conduit, the preliminary pressure chamber is coupled with a leakage chamber. This arrangement advantageously provides that valves, particularly plunger valves which operate with a high switching frequency or a high switching speed need not be designed to be liquid-tight so that one part of the liquid always leaks from the conduit in the region of the valve. By arranging the leakage chamber at the valve and coupling of the leakage chamber with the preliminary pressure chamber it is ensured that the preliminary pressure chamber and the transfer chamber connected therewith are always filled with liquid. This arrangement also ensures that the outflow of the leakage liquid in other leakage regions of the valve is throttled, so that these regions operate practically as a pressure maintaining valve thus ensuring that a sufficient pressure in the preliminary pressure chamber is maintained.

According to a particularly advantageous feature of the invention the leakage chamber and/or the preliminary pressure chamber is coupled by a pressure maintaining valve to a leakage discharge conduit for setting a predetermined preliminary pressure in the preliminary pressure chamber.

DESCRIPTION OF THE PREFERRED EMBODIMENTS

Figure 1:
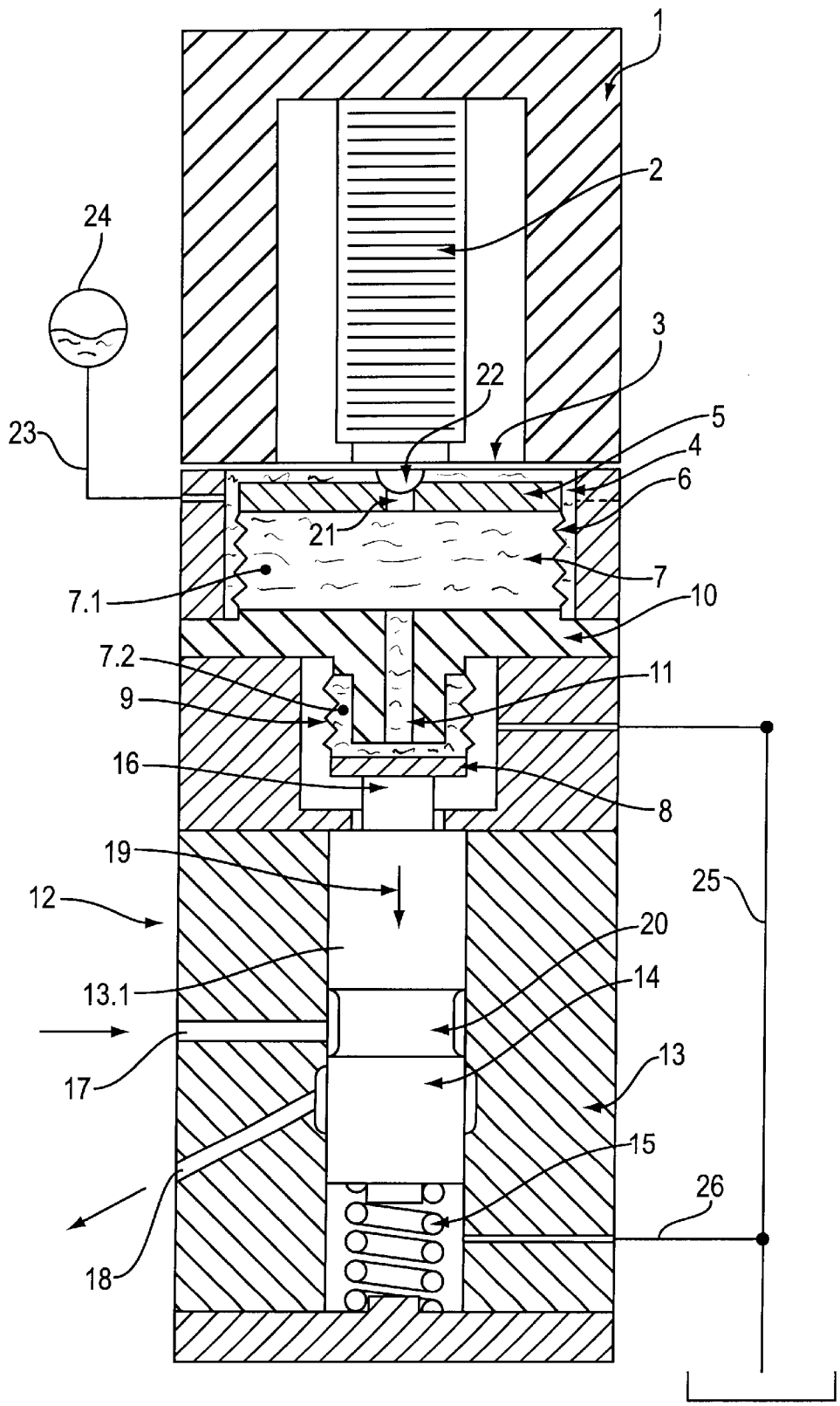
FIG. 1 is an axial sectional view of an actuator according to a preferred embodiment of the invention.

Turning to FIG. 1, the electric solid-body actuator schematically shown therein includes an actuator housing 1 accommodating an actuator body 2 which may be, for example, a piezoelectric or a magnetostrictive system. It is noted that a piezoelectric system is preferred because it is of simpler construction, it operates practically in a loss-free manner, it does not require cooling and it has high switching speeds.

The actuator housing 1 is closed by a relatively thin diaphragm 3 which is directly operatively connected with the actuator body 2.

The diaphragm 3 hermetically seals a preliminary pressure chamber 4 which is also hermetically sealed by a resilient, large-area plate body 5 which forms the base of a resilient bellows 6. The bellows 6, in turn, hermetically separates the preliminary pressure chamber 4 from a transfer chamber 7 which, at its other side, is bordered by a piston body 8 forming part of a further bellows 9. The bellows 6 and 9 are secured to opposite faces of a carrier body 10 which is provided with a coupling port 11 and which forms one part of the transfer chamber 7.

In the embodiment illustrated, a hydraulic plunger valve assembly 12 is provided as the setting means to be operated by the electric solid-body actuator. The plunger valve assembly 12 has a plunger housing 13 provided with a bore 13.1 which receives a valve plunger 14 axially movable against the force of a resetting spring 15. The valve plunger 14 is provided with an axially extending projection 16 contacting the piston body 8 which closes off the transfer chamber 7. A supply port 17 and a discharge port 18 provided in the plunger housing 13 communicate with the bore 13.1. FIG. 1 depicts the valve plunger 14 in the closed position. Upon shifting the valve plunger 14 in the direction of the arrow 19 against the force of the resetting spring 15, the annular groove 20 provided in the valve plunger 14 establishes a direct communication between the supply port (input port) 17 and the discharge port (output port) 18.

The plate body 5 is provided with a valve opening 21 which cooperates with a valve member 22 carried by the diaphragm 3. In the position of rest, the plate body 5 which is resiliently supported by the bellows 6 is urged towards the diaphragm 3 and thus the valve opening 21 is pressed against the valve member 22. In this manner the valve member 22 also serves as a transfer member, by means of which length variations of the actuator body 2 are directly transmitted to the plate body 5. The preliminary pressure chamber 4 and the transfer chamber 7 are filled with a liquid, that is, with an incompressible medium. If an electric voltage is applied to the actuator body 2 its length varies and, by virtue of the connection between the valve member 22 and the plate body 5, the latter is also displaced, to the extent of the length change. Since the surface of the plate body 5 is, in accordance with the desired transmission ratio, larger than the surface of the piston body 8, through the connecting port 11 from the upper part 7.1 of the transfer chamber 7 an amount of liquid is displaced which, because of the lesser volume in the lower part 7.2 of the transfer chamber 7, results in a displacement of the piston body 8 which is proportionately greater than the displacement of the plate body 5. Accordingly, the valve plunger 14 is displaced to the same extent as the piston body 8 and thus communication is established between the ports 17 and 18.

Upon de-energization of the actuator body 2, the latter immediately contracts, as a result of which the valve member 22 briefly opens the valve opening 21 at the plate body 5 and thus during the return motion of the plate body 5 a liquid exchange may take place between the preliminary pressure chamber 4 and the transfer chamber 7. Such a liquid exchange ensures that the transfer chamber 7 is always filled with the same liquid volume and thus, upon actuation, the valve plunger 14 will always execute a stroke of the same amplitude. Dependent upon the geometry selected for the preliminary pressure chamber 4 and the transfer chamber 7, it may be expedient to provide that the preliminary pressure chamber 4 is connected with a volume-equalizing device 24 by a conduit 23. As indicated in FIG. 1, such a device may be a small accumulator chamber similar to a gas bubble accumulator which ensures that in the preliminary pressure chamber 4 and the transfer chamber 7 identical pressure prevails when the valve 21, 22 is open. This arrangement furthermore ensures that expansions of the liquid caused by significant temperature fluctuations do not lead to a change in the transmission geometry in the axial direction but are taken up in the region of the accumulator chamber, whereby a constant volume for the preliminary pressure chamber 4 and the transfer chamber 7 is ensured.

The leakage liquid at the valve plunger 14 is drawn away by a leakage conduit 25 in the region of the projection 16 and by a leakage conduit 26 in the region of the resetting spring 15.

Figure 2:
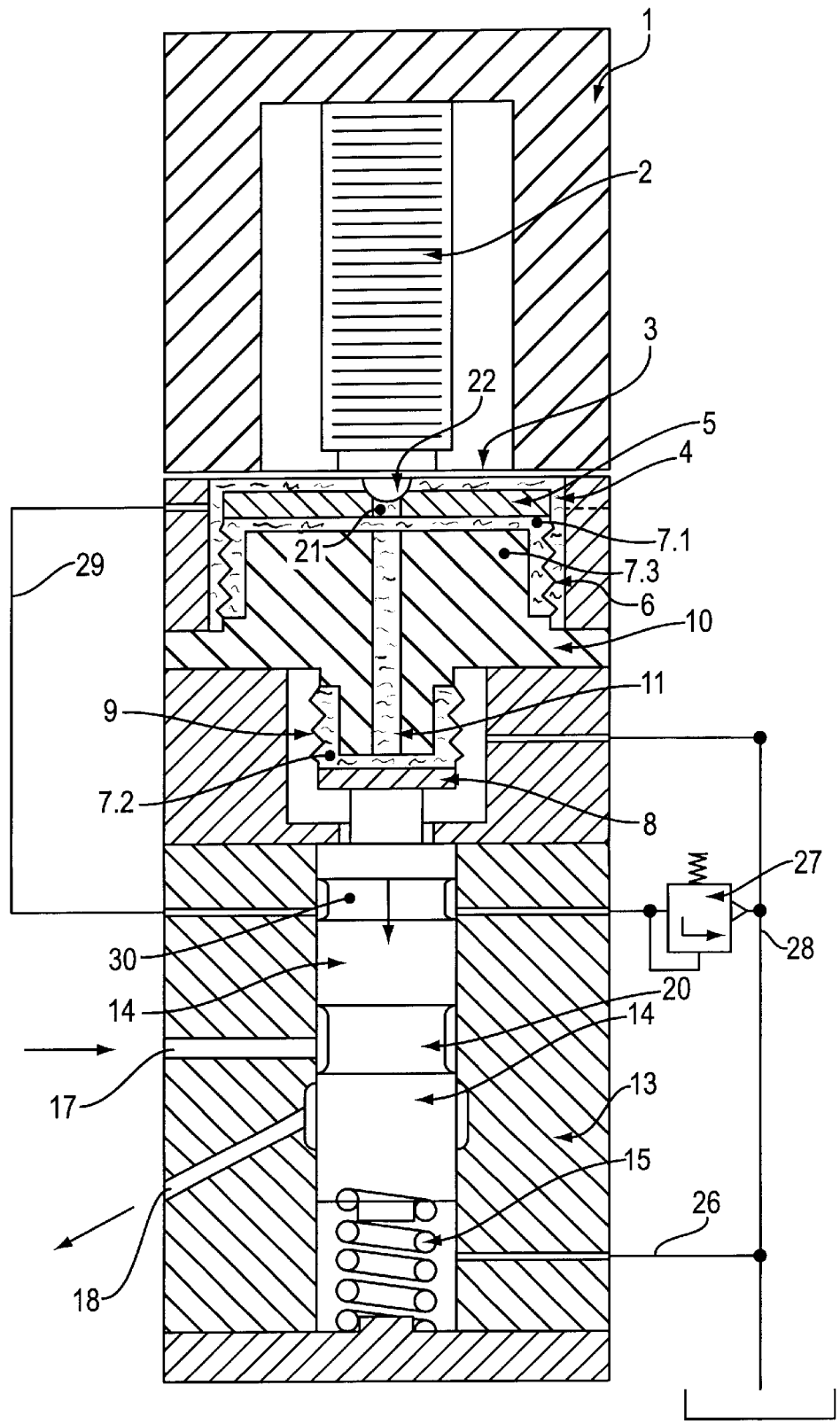
FIG. 2 is an axial sectional view of a variant of the FIG. 1 construction.

Turning to FIG. 2, the embodiment shown therein has a construction which is principally the same as that described in connection with FIG. 1.

While it is in principle feasible to provide, in lieu of the volume equalizing arrangement 24 shown in FIG. 1, a pressure supplying arrangement by means of which a predetermined preliminary pressure may be maintained in the preliminary pressure chamber 4 and the transfer chamber 7, in the embodiment according to FIG. 2 the pressure medium supply arrangement for the preliminary pressure chamber 4 is effected by means of a transfer conduit 29. The conduit 29 transfers one part of the leakage liquid from a leakage collecting chamber 30 provided in the valve plunger 14 into the preliminary pressure chamber 4. This arrangement functions like a pressure supply means for the preliminary pressure chamber 4. By the provision of a pressure maintaining valve 27 which is arranged in a conduit coupling the leakage collecting chamber 30 with the leakage discharge conduit 28, it is ensured that the preliminary pressure chamber 4 is maintained at a constant preliminary pressure so that liquid volume changes caused by temperatures have no negative effect on the transmission system.

In the embodiment according to FIG. 2, the carrier body 10 is provided with a projection 7.3 which extends into the upper part 7.1 of the transfer chamber 7 and by means of which the total volume of the part 7.1 is reduced.

Departing from the FIG. 1 construction, the diaphragm 3 of the FIG. 2 embodiment may be so designed that a portion thereof constitutes the valve member itself which opens and closes the valve opening 21 provided in the plate body 5. This is feasible, for example, by providing that the valve member 22, at its side oriented towards the diaphragm 3, is bounded by an annular ridge which slightly projects beyond the plane of the plate body 5 and which constitutes a valve seat for that diaphragm portion that acts as the valve member.

Figure 3:
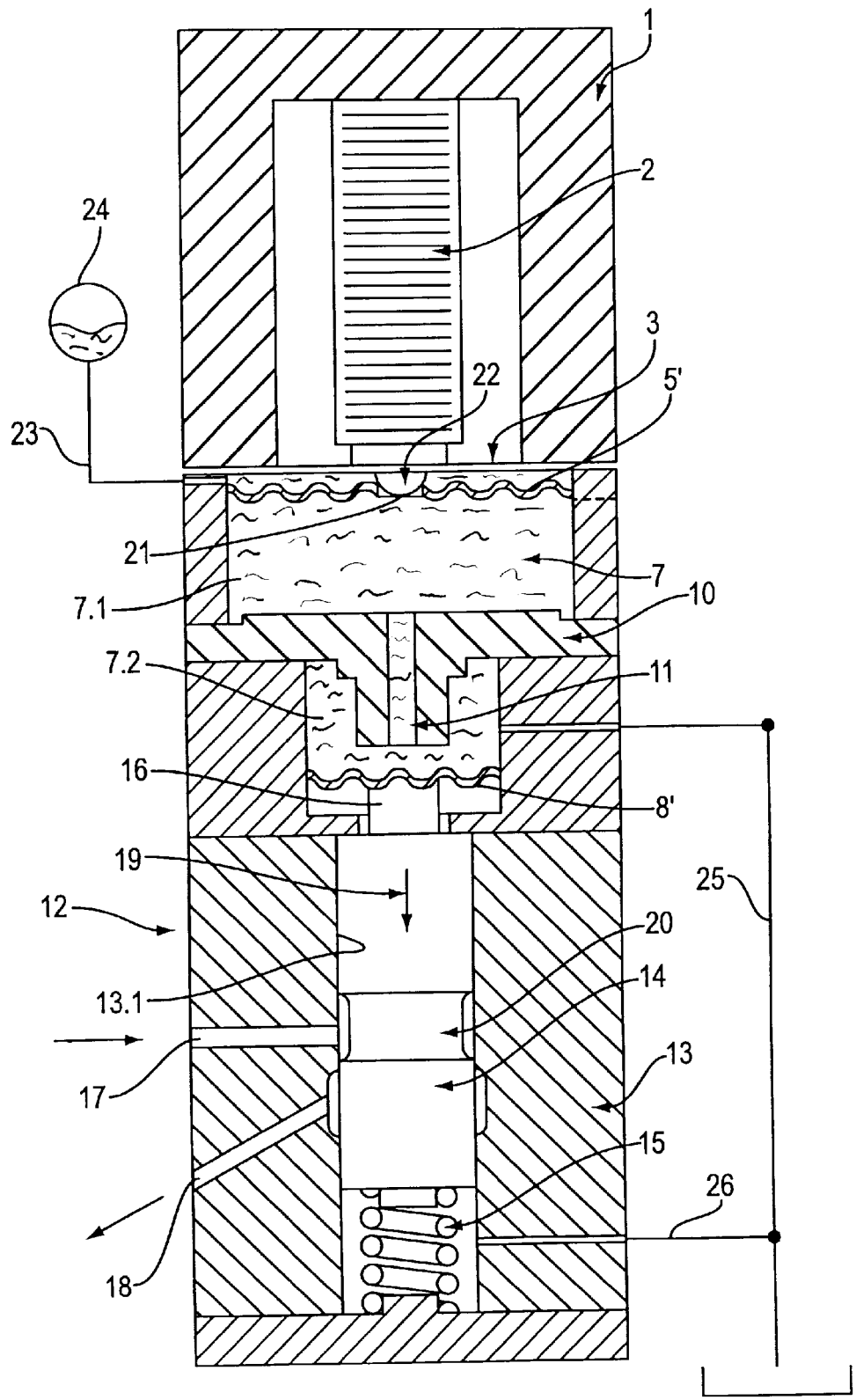
FIG. 3 is an axial sectional view of an actuator according to another preferred embodiment.

Turning to FIG. 3, it is further feasible to form the plate body and/or the piston body itself as a resiliently deformable diaphragm-like structure 5' and 8 respectively to thus replace the bellows 6 and 9. In case of larger setting paths it is expedient to form the plate body 5 and, particularly the piston body 8, in the structures of FIGS. and 2 as a corrugated diaphragm to ensure a greater extent of bending.

It will be understood that the above description of the present invention is susceptible to various modifications, changes and adaptations, and the same are intended to be comprehended within the meaning and range of equivalents of the appended claims.

What is claimed is:

1. An actuator assembly for operating a setting member, comprising
   (a) an actuator body undergoing a dimensional change upon applying electrical energy thereto;
   (b) a housing;
   (c) a preliminary pressure chamber defined in said housing for accommodating liquid;
   (d) a diaphragm sealing said preliminary pressure chamber and being coupled to said actuator body for being displaced by said actuator body;
   (e) a valve member carried by said diaphragm;
   (f) a transfer chamber defined in said housing for accommodating liquid; said transfer chamber having opposite first and second sides;
   (g) a displaceable plate body disposed in said preliminary pressure chamber and having opposite first and second surfaces; said plate body facing said diaphragm with said first surface; said plate body sealingly bounding said transfer chamber at said first side thereof and facing said transfer chamber with said second surface; said diaphragm being operatively coupled with said plate body for causing displacement of said plate body;
   (h) a displaceable piston body sealingly bounding said transfer chamber at said second side thereof; said piston body being displaceable by means of the liquid in said transfer chamber upon motion of said plate body; said plate body having a surface being oriented towards said transfer chamber and being smaller than said second surface of said plate body, whereby a displacement of said piston body is greater than a displacement of said plate body; said piston body being adapted to be coupled to the setting member for displacing the setting member by the piston body; and
   (j) a valve opening provided in said plate body and cooperating with said valve member to be placed into an open and a closed position; in said open position said valve opening establishing a hydraulic communication between said preliminary pressure chamber and said transfer chamber.

2. The actuator assembly as defined in claim 1, wherein said valve member operatively couples said diaphragm with said plate body.

3. The actuator assembly as defined in claim 1, further comprising volume equalizing means coupled to said preliminary pressure chamber for equalizing pressures prevailing in said preliminary pressure chamber and in said transfer chamber.

4. The actuator assembly as defined in claim 1, further comprising a hydraulic fluid supplying device.

5. The actuator assembly as defined in claim 1, in combination with a valve plunger movable in a liquid conduit for controlling ports thereof; said valve plunger constituting said setting member and being connected to said piston body; further comprising a leakage chamber being in communication with said preliminary pressure chamber.

6. The actuator assembly as defined in claim 5, further comprising a discharge conduit and a pressure maintaining valve; said leakage chamber being connected with said discharge conduit through said pressure maintaining valve.

7. The actuator assembly as defined in claim 5, wherein said leakage chamber is provided in said valve plunger.

8. The actuator assembly as defined in claim 1, further comprising a discharge conduit and a pressure maintaining valve; said preliminary pressure chamber being connected with said discharge conduit through said pressure maintaining valve.

9. The actuator assembly as defined in claim 1, wherein said valve member constitutes an integral portion of said diaphragm.

10. The actuator assembly as defined in claim 1, further comprising a bellows and a carrier body; said carrier body being secured to said housing and said plate body being secured to said carrier body by said bellows; an interior of said bellows forming a part of said transfer chamber.

11. The actuator assembly as defined in claim 1, further comprising a bellows and a carrier body; said carrier body being secured to said housing and said piston body being secured to said carrier body by said bellows; an interior of said bellows forming a part of said transfer chamber.

12. The actuator assembly as defined in claim 1, wherein said plate body is a diaphragm.

13. The actuator assembly as defined in claim 1, wherein said piston body is a diaphragm.

14. The actuator assembly as defined in claim 1, further comprising resilient means for resiliently supporting said plate body and said piston body.

15. The actuator assembly as defined in claim 14, wherein said resilient means urges said plate body towards said diaphragm.

\* \* \* \* \*